Figure 2:
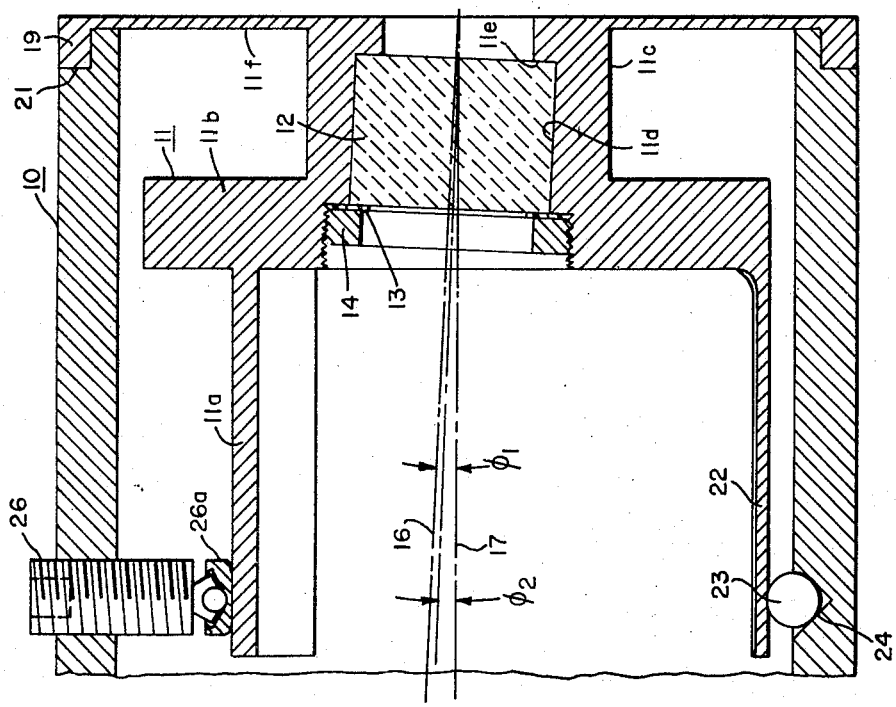

United States Patent Office 3,368,781
Patented Feb. 13, 1968

3,368,781
MOUNTING MECHANISM WITH ANGULAR ADJUSTMENT
Frank E. Altoz, Baltimore, Md., assignor to Westinghouse Electric Corporation, Pittsburgh, Pa., a corporation of Pennsylvania
Filed Nov. 23, 1966, Ser. No. 596,486
6 Claims. (Cl. 248—27)

This invention relates to a support, or mounting mechanism, having a precision angular adjustment. The device is particularly adapted for mounting optical devices, or the like, where precision adjustment is required. However, the invention is not limited to such environment.

Referring to a typical environment of the present invention, in optical apparatus, including laser and infrared systems, a frequent requirement exists for a mounting mechanism that can provide an accurate angular adjustment of the axis of a lens, or group of lenses. The adjustment must be not only precise but must be repeatable, that is, it must be capable of returning to the same exact position of adjustment from some other adjusted position and it must be of very simple construction. Furthermore, it must be of compact size and minimum weight and it is important that once having been adjusted its fixity must continue unaltered when exposed to shock loads normally encountered. When used in military environment, these shock loads can be very great.

Previous designs for such supports have used spring loaded ball plungers and set screws which do not lend themselves to compact assemblies. Where it might be necessary for these screws to enter a sealed liquid filled enclosure, the possibility of leakage exists and this disadvantage is added to the further disadvantage of a large number of adjusting parts.

In accordance with the present invention, the number of moving parts has been reduced to two, one for each of the X and Y coordinates of one end of the support, the other end of the support being supported in a flexible diaphragm whereby conical angular adjustment of the support is possible. In effect, one end of the support is mounted for universal movement about a fixed pivot point permitted by the flexible diaphragm while the other end can be adjusted along the X and Y coordinates.

A primary object of the present invention is to provide an improved adjustable support for a device, such as a lens, which is simple, accurate in adjustment and capable of withstanding heavy impact shocks.

Another object is to provide an improved adjustable support for a device such as a lens, in which one end of the supported is mounted for universal pivotal movement and the other end is provided with a three point suspension two of which are rigid and positively adjustable and the third is yieldable.

Another object is to provide improved support for a lens, or the like, in which the axis of the support is angularly adjustable and in which one end is supported by a flexible metal diaphragm to give a universal pivot point action and the other end is supported by a three point suspension one of which is yieldable and the other two of which are rigidly adjustable to provide a circular path of adjustment.

Figure 1:
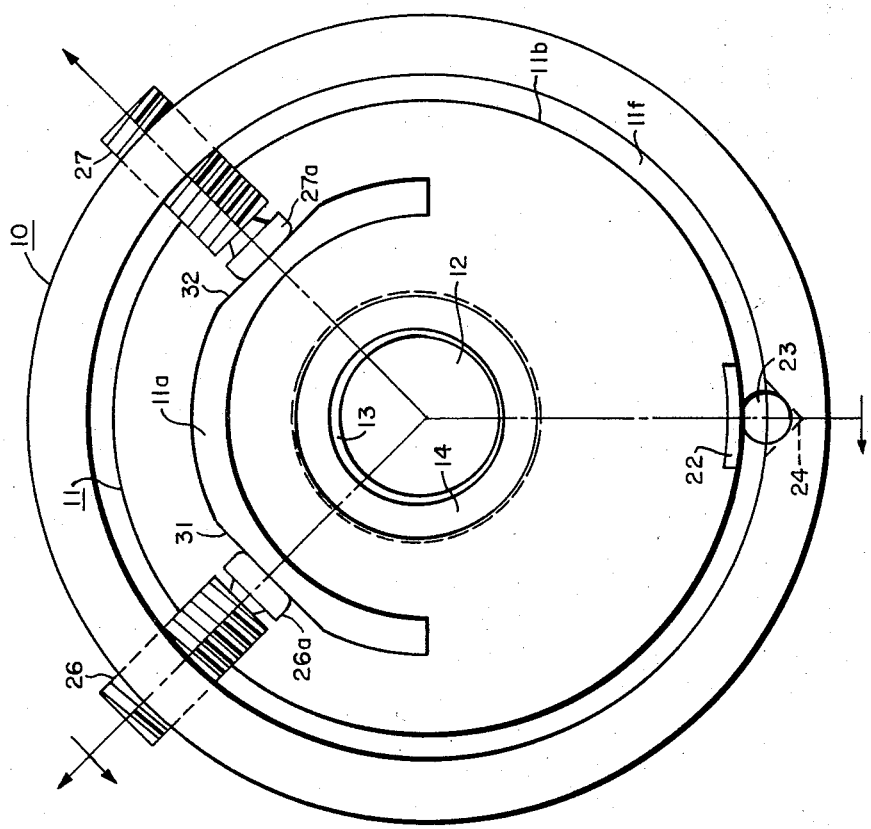

Other and further objects will become apparent from the following description when considered in connection with the accompanying drawings, in which:

FIGURE 1 is an end view of an adjustable support in accordance with the present invention; and FIG. 2 is a sectional view of FIG. 1 on the line II—II looking in the direction of the arrows.

From the drawings, it is apparent that the adjustable support of the present invention constitutes an object holder which may be adjusted angularly in a fixed housing, the object holder being angularly adjustable about axes perpendicular to the longitudinal axis of the holder whereby one end can be moved to generate a conical surface in relation to the fixed housing. More specifically, one end of the holder is supported by a flexible diaphragm to give the effect of a universal pivot point as well as to provide a resilient bias to the central angular position. The other end is provided with a three point suspension, one point being a ball engaging a flexible strut on the holder and the other points being provided with adjustable screws arranged at 90° with respect to each other to move that end of the holder along the X and Y axes, respectively. The arrangement of the two adjustable points at 90° with respect to each other assures a minimum of cross-talk during either adjustments and the resiliently mounted ball adjusting its position to permit the holder to take the position in which represents the resultant of the displacement vectors of the two adjustable screws.

Referring to the drawings, there is shown an illustrated embodiment of the mechanism described briefly above. The adjustable support of the present invention is angularly adjustable with respect to a housing 10 which is in turn supported by the basic apparatus of which the present invention may be a part. In the embodiment illustrated, the housing 10 is cylindrical but it will be apparent that the exact shape of the housing is immaterial so long as its shape is such as to permit the operation of the invention, as described. The angularly adjustable component which constitutes the adjustable support of the present invention is an object holder 11 which is illustrated as serving as a support for a lens 12.

It will be seen that the holder 11 comprises a unit having a semicircular portion 11a integral with an annular web portion 11b having a hub 11c and an integral metal diaphragm 11f. The hub 11c has an accurately machined bore 11d terminated by an inwardly extending flange 11e. The lens 12 is held in the bore 11d between the flange 11e and an elastomeric ring 13 backed by a threaded bushing 14. The axis of the bore 11d is indicated at 16 and it makes an angle $\phi_1$ with the axis 17 of the housing 10.

The hub 11c of the holder is supported in the housing 10 by means of a flexible disc diaphragm 11f, which may be an integral part of the hub or may be separately attached by welding to the hub and is provided with an annular ring 19 which engages a recess 21 in the outer end of the housing 10. The flexible disc diaphragm 11f supports the right-hand end of the object holder 11 and permits universal pivotal movement of the holder. The flexibility of the diaphragm, in effect, provides a universal mounting and at the same time resiliently urges the holder to its neutral position wherein the axis of holder 11 makes an angle $\phi_1$ with the axis 17 of the housing 10.

To permit relative angular movement between the object holder 11 and the housing 10, a flexible strut 22 extends from the web 11b and rests on a ball bearing 23 which in turn rests in a recess 24 in the inner surface of the housing 10. The ball bearing 23 lies on the bisector of the angle between the axes of two adjusting screws 26 and 27 which extend through the housing 10 at right angles to each other. The inner ends of the screws 26 and 27 have respective swivel pads 26a and 27a, respectively, which engage flat lands 31 and 32, respectively, on the semicircular portion 11a of the holder 11. The strut 22 resiliently urges the holder 11 against the pads on the adjusting screws. Combinations of movements of the screws 26 and 27 can cause movement of the left-hand end of the holder 11 to describe a blur circle with the resilient strut 22 resiliently urging the semicircular portion 11a against both the adjusting screw pads. Since the right-hand end of the holder 11 is restrained by the diaphragm 11f against rotational or translational movement, adjustment of the screws 26 and 27 can produce conical angular adjustment of the holder 11 with respect to the housing 10.

It is to be noted from FIG. 1 that $\phi_2$, a typical angle betwen the axis 17 of the housing 10 and the axis of the lens 12 represents the maximum desired adjustment. By machining the bore 11d so that its axis 16 makes the angle $\phi_1$ between the axis of the lens and the axis of the holder 11 (indicated at 17), the support is made shock resistant to the extent that the amount of pre-load, produced by the resilient spring force of the diaphragm 11f caused by the angular difference $\phi_1 - \phi_2$.

The combination of the rigidly adjustable pads 26a and 27a and the flexible strut 22 provides a resilient support for one end of the lens holder 11 so that transverse linear impacts will not be transmitted directly to the mounting but the flexible diaphragm 11f will permit an angular moment to be applied to the holder. The outer surface of the strut 22, which engages the ball bearing 23, is Teflon coated to reduce the coefficient of friction at the interface. Changes of position of the adjusting screws 26 and 27 along their respective axes produces an angular shift in the position of the lens holder 11 about a fixed point determined by the flexing of the diaphragm 11f. The moment about this fixed point results from angular displacement caused by adjusting screws 26 and 27 and may be expressed mathematically as $$M = \alpha E t^3 \theta \quad (1)$$

where $\alpha$ is a constant and depends on the ratio $r_0/a$, $r_0$ being the radius of the hub 11c and $a$ being the radius of the inner surface of the housing 10; E is the modulus of elasticity; $t$ is the thickness of the diaphragm 11f; and $\theta$ is the angular deflection. This moment causes a stress to develop in the diaphragm, by an amount $$S = \beta \frac{M}{at^2} \quad (2)$$

depends on the ratio $r_0/a$ where $\beta$ is a constant and M is the moment defined above. In this situation, the strut 22 develops a moment M, and stress $$S_b = \frac{M_1}{Z} \quad (3)$$

where Z is the section modulus.

In an application requiring conical adjustment of ±17.4 milliradians, some typical design values for the mechanism are as follows. The thickness of the diaphragm 11f was .015 inch, the cross-section of the strut 22 was .030 inch by .50 inch wide for 7075 ST aluminum material. The steel ball 23 is .125 inch in diameter and a standard swivel pad manufactured by Vlier is #10-32 screw approximately .50 inch long.

It will be apparent to those skilled in the art that various changes may be made in the construction without departing from the spirit of the invention.

I claim as my invention:

1. In an adjustable support, an outer supporting member, a flexible metal diaphragm carried by said supporting member, an inner supported member having one end supported by said diaphragm, means for supporting and positioning the other end of said supported member relative to said outer supporting member at three angularly spaced points, at one of said points said supporting means being yieldable.

2. The combination as set forth in claim 1 in which at two of said points said supporting means are rigidly adjustable along angularly displaced radial axes and said yieldable means exerts force on said supported member to hold the latter against said rigidly adjustable means.

3. The combination as set forth in claim 2 in which said rigidly adjustable means acts directly on said supported member and said yieldable means is a cantilever element acting against a fixed point on said supporting member.

4. The combination as set forth in claim 3, in which said supporting member is a tubular housing, said supported member having a rigd semi-cylindrical portion in substantially concentric relation with said housing, said supported member also having a flexible strut element parallel to the axis of said diaphragm, means operable between said supporting member and said supported member for urging said semi-cylindrical portion in directions transverse to the axis of said diaphragm, all such movement being resiliently opposed by said flexible strut.

5. The combination as set forth in claim 4, in which said supported member has means for receiving and holding a device to be accurately positioned in a slightly "off-axis" position so that when said rigidly adjustable means are adjusted to "on-axis" position said yieldable means will be preloaded to protect said device against shock impacts.

6. The combination as set forth in claim 3 in which said rigidly adjustable means are a pair of threaded members threadedly engaging said housing for movement along radial axis disposed angularly symmetricl with respect to the radial axis along which said yieldable means acts.

References Cited

UNITED STATES PATENTS

| | | | |
|---|---|---|---|
| 1,586,004 | 5/1926 | Regelein et al. | 248—358.1 XR |
| 2,387,065 | 10/1945 | Harding | 248—358 |
| 3,093,002 | 6/1963 | Logan et al. | 248—27 XR |

JOHN PETO, *Primary Examiner.*